(12) United States Patent
Ichikawa et al.

(10) Patent No.: US 12,191,661 B2
(45) Date of Patent: Jan. 7, 2025

(54) SYSTEM AND METHOD FOR SUPPORTING CREATION OF SYSTEM PLAN TO CHANGE CONFIGURATION OF POWER SYSTEM

(71) Applicant: Hitachi, Ltd., Tokyo (JP)

(72) Inventors: Tsubasa Ichikawa, Tokyo (JP); Shinya Suenaga, Tokyo (JP); Yasuyuki Tada, Tokyo (JP); Yasushi Miyata, Tokyo (JP); Yoshiki Kurokawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 19 days.

(21) Appl. No.: 18/030,862

(22) PCT Filed: Oct. 14, 2021

(86) PCT No.: PCT/JP2021/038026
§ 371 (c)(1),
(2) Date: Apr. 7, 2023

(87) PCT Pub. No.: WO2022/085553
PCT Pub. Date: Apr. 28, 2022

(65) Prior Publication Data
US 2023/0378806 A1    Nov. 23, 2023

(30) Foreign Application Priority Data
Oct. 20, 2020 (JP) .................... 2020-175920

(51) Int. Cl.
*H02J 13/00* (2006.01)
*H02J 3/00* (2006.01)

(52) U.S. Cl.
CPC ...... *H02J 13/00034* (2020.01); *H02J 3/0012* (2020.01); *H02J 3/0073* (2020.01)

(58) Field of Classification Search
CPC .............. H02J 13/00034; H02J 3/0012; H02J 3/0073; H02J 2203/20; H02J 3/00; G06Q 10/0637; G06Q 50/06; Y04S 10/50
(Continued)

(56) References Cited

U.S. PATENT DOCUMENTS

2011/0115308 A1    5/2011  Wang et al.

FOREIGN PATENT DOCUMENTS

JP    2018-153004 A    9/2018

OTHER PUBLICATIONS

International Search Report of PCT/JP2021/038026 dated Dec. 28, 2021.
(Continued)

*Primary Examiner* — Richard Tan
(74) *Attorney, Agent, or Firm* — MATTINGLY & MALUR, PC

(57) ABSTRACT

Disclosed is a system for supporting creation of a system plan to change a configuration of a power system including a power transmission system and a power distribution system. The system stores information on a configuration of the power transmission system and information on a configuration and a load of the power distribution system. The system determines, based on the information on the configuration and the load of the power distribution system, a load accommodation capacity between power distribution substations which indicates a power supply capacity allowed to be compensated for between the power distribution substations through a configuration change of the power distribution system. The system creates a system plan proposal including a change in system configuration of the power transmission system and the power distribution system
(Continued)

based on the load accommodation capacity. The system outputs information on the system plan proposal to an output device.

11 Claims, 15 Drawing Sheets

(58) Field of Classification Search
USPC .......................................................... 307/38
See application file for complete search history.

(56) References Cited

OTHER PUBLICATIONS

Extended European Search Report received in corresponding European Application No. 21882694.9 dated Oct. 21, 2024.
Nunes, Juliana Souza et al., "Impact of Transmission and Subtransmission Failures on Distribution Reliability Indices", 2018 IEEE International Conference on Probabilistic Methods applied to Power Systems, Jun. 24, 2018, pp. 1-6.

| DISTRIBUTION AREA | SAIFI [TIMES/YEAR] | SAIDI [HOURS/YEAR] |
|---|---|---|
| A | 0.62 | 1.42 |
| B | 0.15 | 0.52 |
| C | 0.20 | 0.44 |
| D | 0.21 | 0.46 |
| E | 0.18 | 0.32 |

SUPPLY RELIABILITY LEVEL INDEX FOR EACH DISTRIBUTION AREA

FIG. 7

| POWER DISTRIBUTION SUBSTATION | NUMBER OF CONNECTED CUSTOMERS $N_i$ | EQUIVALENT FAILURE RATE $\lambda_i$ | EQUIVALENT FAILURE TIME PERIOD $U_i$ |
|---|---|---|---|
| DS108 | 1500 | 0.2 | 0.6 |
| DS109 | 1000 | 0.4 | 1.2 |
| DS110 | 720 | 2.2 | 4.0 |
| DS111 | 950 | 0.3 | 1.0 |
|  |  | SAIFI=0.62 | SAIDI=1.42 |

NUMBER OF CONNECTED CUSTOMERS AND EQUIVALENT FAILURE PARAMETERS OF EACH POWER DISTRIBUTION SUBSTATION IN DISTRIBUTION AREA (A)

FIG. 8

| ID ~901 | FACILITY NAME ~902 | FAILURE RATE [TIMES/YEAR] ~903 | DEGREE OF INFLUENCE OF FAILURE RATE ~904 | FAILURE TIME PERIOD [HOURS/YEAR] ~905 | DEGREE OF INFLUENCE OF FAILURE TIME PERIOD ~906 | YEARS OF SERVICE ~907 |
|---|---|---|---|---|---|---|
| TR1101 | TRANSFORMER | 0.30 | 11% | 0.3 | 9% | 42 YEARS |
| B1101 | BUS | 0.21 | 9% | 0.4 | 11% | 42 YEARS |
| TR1102 | TRANSFORMER | 0.15 | 7% | 0.3 | 9% | 42 YEARS |
| TL45 | POWER TRANSMISSION LINE | 0.06 | 4% | 0.1 | 5% | 42 YEARS |
| : | : | : | : | : | : | : |

DEGREE OF INFLUENCE ON EQUIVALENT FAILURE RATE AND
EQUIVALENT FAILURE TIME PERIOD IN POWER DISTRIBUTION SUBSTATION (DS110)

*FIG. 9*

| ADJACENT POWER DISTRIBUTION SUBSTATION | LOAD ACCOMMODATION CAPACITY | LOAD CONSTRAINT | RELIABILITY LEVEL CONSTRAINT | VOLTAGE CONSTRAINT |
|---|---|---|---|---|
| DS108 | 400 HOUSES | 1050 HOUSES | 400 HOUSES | 450 HOUSES |
| DS109 | 500 HOUSES | 1200 HOUSES | 500 HOUSES | 700 HOUSES |
| DS111 | 500 HOUSES | 1500 HOUSES | 600 HOUSES | 500 HOUSES |

LOAD ACCOMMODATION CAPACITY OF EACH POWER DISTRIBUTION SUBSTATION ADJACENT TO POWER DISTRIBUTION SUBSTATION DS110

FIG. 14

| COUNTERMEASURE SITE IN POWER TRANSMISSION FACILITY | | | |
|---|---|---|---|
| ID | FACILITY NAME | PLANT TO WHICH FACILITY BELONGS | COUNTERMEASURE DETAIL |
| TR1101 | TRANSFORMER | DS110 | DISCONTINUANCE |
| TR1102 | TRANSFORMER | DS110 | DISCONTINUANCE |
| B1101 | BUS | DS110 | DISCONTINUANCE |
| B1102 | BUS | DS110 | DISCONTINUANCE |
| SWITCH OPERATION FOR POWER DISTRIBUTION SYSTEM | | | |
| ID | CURRENT STATE | OPERATION | |
| SW33A | OPENED | CLOSE | |
| SW34B | CLOSED | OPEN | |
| SW35A | CLOSED | OPEN | |
| : | : | : | |

SYSTEM PLAN PROPOSAL (DISCONTINUANCE PROPOSAL OF DS110)

FIG. 15

RELIABILITY BEFORE COUNTERMEASURES AGAINST POWER DISTRIBUTION SUBSTATION DS110

1600

| POWER DISTRIBUTION SUBSTATION | NUMBER OF CUSTOMERS | EQUIVALENT FAILURE RATE $\lambda_i$ [TIMES/YEAR] | EQUIVALENT FAILURE TIME PERIOD $U_i$ [HOURS/YEAR] | $SAIFI_{dist}$ | $SAIDI_{dist}$ |
|---|---|---|---|---|---|
| 108 | 1500 | 0.2 | 0.6 | 0.8 | 1.4 |
| 109 | 1000 | 0.4 | 1.2 | 1.0 | 1.9 |
| 110 | 720 | 2.2 | 4.0 | 3.1 | 4.5 |
| 111 | 950 | 0.3 | 1.0 | 1.1 | 1.6 |
| | | $SAIFI_{tr}$: 0.62 [TIMES/YEAR] | $SAIDI_{tr}$: 1.42 [HOURS/YEAR] | Ave. 1.50 | Ave. 2.35 |

*FIG. 16*

1700 — RELIABILITY IN CASE OF RENEWAL PROPOSAL OF POWER DISTRIBUTION SUBSTATION DS110

| POWER DISTRIBUTION SUBSTATION | NUMBER OF CUSTOMERS | EQUIVALENT FAILURE RATE $\lambda_i$ [TIMES/YEAR] | EQUIVALENT FAILURE TIME PERIOD $U_i$ [HOURS/YEAR] | $SAIFI_{dist}$ | $SAIDI_{dist}$ |
|---|---|---|---|---|---|
| 108 | 1500 | 0.2 | 0.6 | 0.7 | 1.2 |
| 109 | 1000 | 0.4 | 1.2 | 0.9 | 1.8 |
| 110 | 720 | 0.1 | 0.3 | 0.5 | 0.9 |
| 111 | 950 | 0.3 | 1.0 | 1.0 | 1.5 |
| | | $SAIFI_{tr}$: 0.25 [TIMES/YEAR] | $SAIDI_{tr}$: 0.78 [HOURS/YEAR] | Ave. 0.78 | Ave. 1.35 |

RELIABILITY IN CASE OF DISCONTINUANCE PROPOSAL OF POWER DISTRIBUTION SUBSTATION DS110

| POWER DISTRIBUTION SUBSTATION | NUMBER OF CUSTOMERS | EQUIVALENT FAILURE RATE $\lambda_i$ [TIMES/YEAR] | EQUIVALENT FAILURE TIME PERIOD $U_i$ [HOURS/YEAR] | $SAIFI_{dist}$ | $SAIDI_{dist}$ |
|---|---|---|---|---|---|
| 108 | 1700 | 0.2 | 0.6 | 1.1 | 2.0 |
| 109 | 1260 | 0.4 | 1.2 | 1.3 | 2.6 |
| 110 | 720→0 | 2.2 | 4.0 | 3.1 | 4.5 |
| 111 | 1210 | 0.3 | 1.0 | 1.7 | 2.5 |
| | | $SAIFI_{tr}$=0.29 [TIMES/YEAR] | $SAIDI_{tr}$=0.90 [HOURS/YEAR] | Ave. 1.37 | Ave. 2.37 |

SYSTEM AND METHOD FOR SUPPORTING CREATION OF SYSTEM PLAN TO CHANGE CONFIGURATION OF POWER SYSTEM

CLAIM OF PRIORITY

The present application claims priority from Japanese patent application JP 2020-175920 filed on Oct. 20, 2020, the content of which is hereby incorporated by reference into this application.

BACKGROUND

This invention relates to a system for supporting creation of a system plan to change a configuration of a power system.

With changes in environment surrounding power systems, such as power system reforms, there are demands for thorough utilization of existing facilities and further cost reductions. Of those, system facilities that form a power system are required to be systematically renewed based on use states and years of service thereof.

Hitherto, system facilities have been enhanced in order to meet the large growth in power demand. However, in recent years, power demands have tended to decrease, and utilization efficiency of system facilities has also tended to decrease. Therefore, it is required to formulate a rational system plan to eliminate an unrequired facility and reduce costs while maintaining a supply reliability level.

In JP 2018-153004 A, there is described a power supply path evaluation device capable of efficiently selecting a facility candidate to be shut down while maintaining a certain supply reliability level when renewing a power system facility. The power supply path evaluation device selects, from among a plurality of power supply paths, power supply paths in which the number of power failures that have occurred in a predetermined period is equal to or smaller than a threshold value in a case in which a power transmission or distribution facility has been shut down. In addition, a path that establishes an electrical system is selected from among the selected power supply paths, to thereby be able to efficiently formulate a facility renewal plan in consideration of the shutdown of an unrequired facility.

Patent document 1: JP 2018-153004 A

SUMMARY

A power system is divided into a plurality of voltage classes, and in terms of roles, divided into a power transmission system that carries a large amount of power from a power plant and a power distribution system that distributes power from a substation to a final consumption point. In addition, different departments are responsible for managing the power transmission system and the power distribution system. Therefore, when the facility renewal plan is examined, the plan is examined by each department individually, and hence there is a possibility of causing waste in the system as a whole and failing to achieve a system plan that is optimal as a whole.

In the technology as described in JP 2018-153004 A, a subject to be renewed is a system facility in a single voltage class of a power transmission system or a power distribution system, and there is a problem in that influences on both the power transmission system and the power distribution system are not taken into consideration for the facility renewal. For example, information available when a power transmission department formulates a renewal plan of a power distribution substation is only a system configuration of the power transmission system ranging up to the power distribution substation. Therefore, even when it is possible to discontinue a target power distribution substation through load accommodation on the power distribution system side, the power transmission department cannot grasp a system configuration of the power distribution system beyond the power distribution substation, and thus cannot make a decision to discontinue the power distribution substation. In other words, there is a fear in that system planning by individual departments may lead to excessive facility investment in response to the power demands that have tended to decrease and result in inefficient facility formation.

Therefore, in regard to renewal planning for a power transmission facility, it is desired to develop a technology in which the power transmission department and the power distribution department coordinate with each other to formulate a system plan in consideration of the system configuration of the power distribution system as well.

An aspect of this invention is a system for supporting creation of a system plan to change a configuration of a power system including a power transmission system and a power distribution system, the system including: one or more processing devices; and one or more storage devices, wherein the one or more storage devices are configured to store information on a configuration of the power transmission system and information on a configuration and a load of the power distribution system, and wherein the one or more processing devices are configured to: determine, based on the information on the configuration and the load of the power distribution system, a load accommodation capacity between power distribution substations which indicates a power supply capacity allowed to be compensated for between the power distribution substations through a configuration change of the power distribution system; create a system plan proposal including a change in system configuration of the power transmission system and the power distribution system based on the load accommodation capacity; and output information on the system plan proposal to an output device.

According to the at least one aspect of this invention, it is possible to support the formulation of a system plan that is appropriate for the entire power system.

BRIEF DESCRIPTION OF THE DRAWINGS

FIG. 7 is a table for showing supply reliability level indices for each distribution area.

FIG. 8 is a table for showing the number of connected customers and equivalent failure parameters of each power distribution substation in a distribution area.

FIG. 9 is a table for showing degrees of influence on an equivalent failure rate and an equivalent failure time period in the power distribution substation.

FIG. 14 is a table for showing the load accommodation capacity for each adjacent power distribution substation.

FIG. 15 is a table for showing a data example of a system plan proposal.

FIG. 16 is a table for showing reliability before countermeasures against the power distribution substation.

FIG. 17 is a table for showing reliability in a case of a renewal proposal of the power distribution substation.

FIG. 18 is a table for showing reliability in a case of a discontinuance proposal of the power distribution substation.

DETAILED DESCRIPTION OF EMBODIMENTS

Now, at least one embodiment is described with reference to the accompanying drawings. The following description is divided into a plurality of sections or embodiments as required for the sake of convenience. However, unless otherwise explicitly specified, those sections or embodiments are not independent of each other, and one thereof serves as a modification example, details, a supplementary description, or the like of a part or entirety of another one of the sections or embodiments. In addition, when the following description includes a part that refers to a certain number or the like of elements (such as the quantity, numerical value, amount, or range thereof), unless otherwise explicitly specified or obviously limited to a specific number in principle, the part is not limited to the certain number, and a number larger than or smaller than the certain number may be employed.

The following description is given of a technology that enables an efficient system plan to be formulated in consideration of both systems of a power transmission system and a power distribution system. In at least one embodiment of this specification, a power system plan proposal including configuration changes of the power transmission system and the power distribution system is created in consideration of a power supply capacity that can be compensated for by a configuration change of the power distribution system. Thus, it is possible to create an appropriate system plan proposal for an entire power system. In addition, effects of the power system plan proposal on the entire power system are evaluated and presented, to thereby be able to support a user in creating an appropriate system plan for the entire power system.

<Overview of Embodiment>

A system planning support coordination system according to the at least one embodiment is a system for supporting, when renewal of a power transmission facility is examined, formulation of a system plan including discontinuance of a power transmission facility to be examined due to a change in system configuration of a power distribution system.

<Configuration of System Planning Support Coordination System>

Figure 1A:
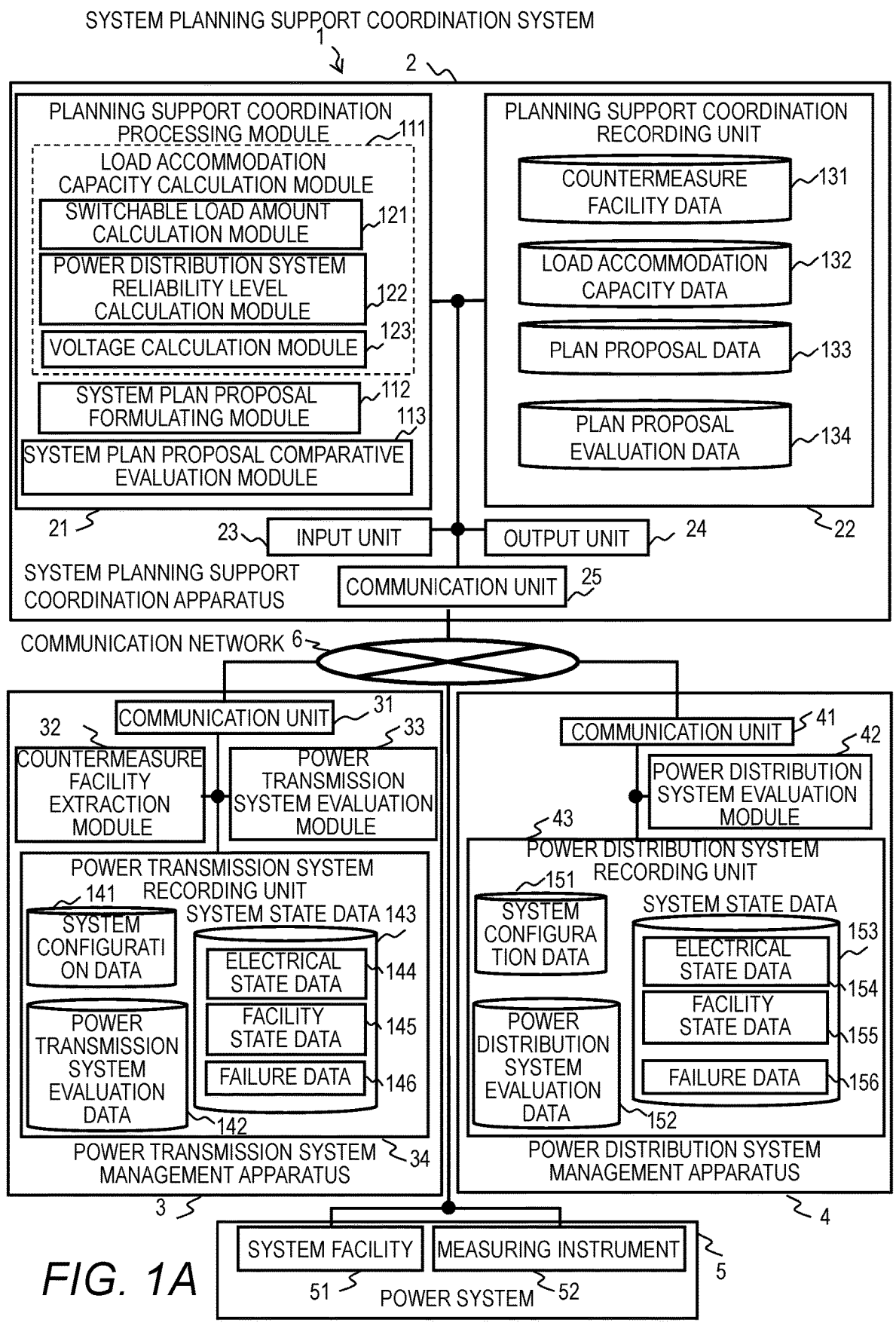
FIG. 1A is a diagram of a configuration example of a system planning support coordination system.

In FIG. 1A, a system planning support coordination system 1 according to the at least one embodiment includes a system planning support coordination apparatus 2, a power transmission system management apparatus 3, a power distribution system management apparatus 4, and a power system 5. The system planning support coordination apparatus 2, the power transmission system management apparatus 3, the power distribution system management apparatus 4, and the power system 5 are coupled to each other so as to enable communication therebetween through a communication network 6.

Figure 1B:
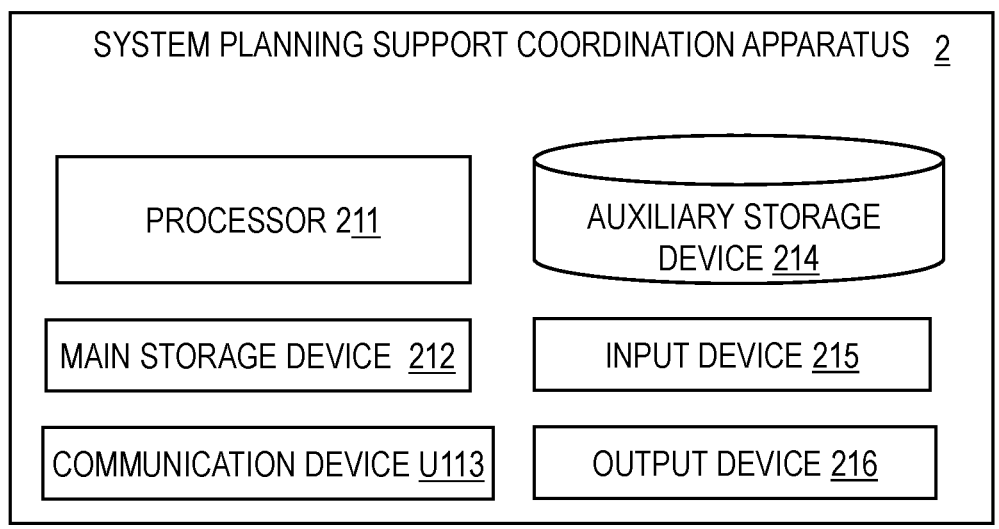
FIG. 1B is a diagram for illustrating a configuration example of a computer.

FIG. 1B is an illustration of a hardware configuration example of the system planning support coordination apparatus 2. The power transmission system management apparatus 3 and the power distribution system management apparatus 4 can also have the same configuration. The system planning support coordination apparatus 2 is a circuit, a printed circuit board, a server, an information processing device, or the like including one or more processors 211, one or more main storage devices 212, one or more auxiliary storage devices 214, and one or more communication devices U113. Examples of the processor 211 include a central processing unit (CPU) and a microprocessor. Examples of the main storage device 212 or the auxiliary storage device 214 include a DRAM, a hard disk drive, and a solid-state drive (SSD).

Each storage device includes a non-transitory storage medium including a program and data to be processed by the program. The system planning support coordination apparatus 2 may include an output device 216 that presents information to a user and an input device 215 that enables the user to input data. The output device 216 includes a display and a printer, and the input device 215 includes a mouse, a keyboard, and a touch panel.

The system planning support coordination apparatus 2 includes a planning support coordination processing module 21 that performs various kinds of processing, a planning support coordination recording unit 22 that records (stores) various kinds of information, an input unit 23 that inputs various kinds of information, an output unit 24 that outputs various kinds of information, and a communication unit 25 that communicates to/from various kinds of apparatus and devices through the communication network 6.

The power transmission system management apparatus 3 includes a communication unit 31 that communicates to/from various kinds of apparatus and devices through the communication network 6, a countermeasure facility extraction module 32 that extracts a power transmission facility in a power transmission system against which countermeasures are to be taken in a system plan, a power transmission system evaluation module 33 that evaluates a degree of influence of the power transmission system on a system plan, and a power transmission system recording unit 34 that records various kinds of data in the power transmission system.

The power transmission system management apparatus 3 includes a communication unit 41 that communicates to/from various kinds of apparatus and devices through the communication network 6, a power distribution system evaluation module 42 that evaluates a degree of influence of the power distribution system on a system plan, and a power distribution system recording unit 43 that records various kinds of data in the power distribution system.

Functions of the planning support coordination processing module 21, the countermeasure facility extraction module 32, the power transmission system evaluation module 33, and the power distribution system evaluation module 42 may be implemented by a processor executing various programs stored in the storage devices, or may be implemented by a logic circuit that performs specific processing. Such a processor or a logic circuit are also referred to as "processing device." In addition, the functions of the planning support coordination processing module 21, the countermeasure facility extraction module 32, the power transmission system evaluation module 33, and the power distribution system evaluation module 42 are not limited to those implemented by a single apparatus or device, and may be implemented by a plurality of apparatus and devices coupled to each other so as to enable communication therebetween.

The planning support coordination recording unit 22, the power transmission system recording unit 34, and the power distribution system recording unit 43 are implemented by one or more storage devices. The communication units 25, 31, and 41 are implemented by communication devices. The input unit 23 is a keyboard, a pointing device such as a mouse, a touch panel, a voice instruction device, or the like, and is implemented by including at least one thereof. The output unit 24 is a display device, a printer, a voice output device, or the like, and is implemented by including at least one thereof.

The system planning support coordination apparatus 2, the power transmission system management apparatus 3, and the power distribution system management apparatus 4 may be implemented as an integrated apparatus, and the communication units 25, 31, and 41 may be configured as a common component.

The power system 5 includes a power generation system, a power transmission system, and a power distribution system. The power system 5 includes: a system facility 51 including a power generation facility (for example, power plant) that generates power through use of a power generation device, a consumer facility that consumes the power generated by the power generation facility, and power distribution facilities (power transmission facility, substation facility, power distribution facility, and the like) that transmit power from the power generation facility to the consumer facility; and a measuring instrument 52 that measures a state of the system facility 51.

The power generation device is a device that performs thermal power generation, hydraulic power generation, nuclear power generation, geothermal power generation, solar power generation, wind power generation, or the like, and may also be a device that performs power generation by various other power generation methods. The power distribution facilities include overhead power transmission and distribution lines, underground power transmission and distribution lines, buses, transformers, circuit breakers, switches, and phase modifying facilities, and also include various other facilities relating to power transmission and distribution.

The measuring instrument 52 measures a state of the power system 5 at a specific measurement point. Examples of a measurement item can include power items such as a voltage, a phase, an active power, and a reactive power of the power system 5, meteorological items such as a temperature, a wind speed, a wind direction, an amount of precipitation, and an amount of solar radiation, and items of a setting state and an operation state of the system facility 51. In addition, various items can be used as measurement items.

The measurement points include the buses of the power generation facilities, the buses of the substation facilities, the power distribution facilities, and the consumer facilities, and the number of measuring devices for one measurement point may be one or more. Of values measured by the measuring instrument 52, a value measured for the power transmission facility belonging to the power transmission system is transmitted to the power transmission system recording unit 34 and a value measured for the power distribution facility belonging to the power distribution system is transmitted to the power distribution system recording unit 43 through the communication network 6. The measuring instrument 52 may transmit the measured value by adding thereto information on a date and time of measurement.

<System Planning Support Coordination Apparatus>

The planning support coordination processing module 21 includes a load accommodation capacity calculation module 111, a system plan proposal formulating module 112, and a system plan proposal comparative evaluation module 113. The load accommodation capacity calculation module 111 calculates a load accommodation capacity between power distribution substations in the power distribution system. The load accommodation capacity between power distribution substations indicates a load amount that can be accommodated between the power distribution substations. The system plan proposal formulating module 112 creates a system plan proposal through use of the load accommodation capacity calculated by the load accommodation capacity calculation module 111. The system plan proposal comparative evaluation module 113 comparatively evaluates the degrees of influence of the system plan proposal created by the system plan proposal formulating module 112 on the power transmission system and the power distribution system.

The load accommodation capacity calculation module 111 includes a switchable load amount calculation module 121, a power distribution system reliability level calculation module 122, and a voltage calculation module 123. The switchable load amount calculation module 121 calculates a switchable load amount under a constraint of the load amount connected to a power distribution line. The power distribution system reliability level calculation module 122 calculates a reliability level of the power distribution system that can be guaranteed when a load is switched. The voltage calculation module 123 calculates a voltage of the power distribution system that changes when the load is switched.

The planning support coordination recording unit 22 stores countermeasure facility data 131, load accommodation capacity data 132, plan proposal data 133, and plan proposal evaluation data 134. The countermeasure facility data 131 includes information on a facility to be examined at a time of formulating a system plan. The load accommodation capacity data 132 includes a value of the load accommodation capacity calculated by the load accommodation capacity calculation module 111. The plan proposal data 133 includes information on a system plan proposal created by the system plan proposal formulating module 112. The plan proposal evaluation data 134 is an evaluation result of the plan proposal.

<Power Transmission System Management Apparatus>

The power transmission system recording unit 34 stores system configuration data 141, power transmission system evaluation data 142, and system state data 143. The system configuration data 141 includes specification data on facilities such as overhead power transmission lines, underground power transmission lines, buses, transformers, switches, and phase modifying facilities, positional information on those facilities, and information indicating connection relationships therebetween. In addition, the power transmission system recording unit 34 includes: loads (for example, number of downstream customers, current value, active power, and reactive power) of the power distribution substation; and information relating to costs of the power transmission system, for example, information for calculating an operation cost, a maintenance cost, a construction cost, and the like of each facility.

The power transmission system evaluation data 142 includes, for a system plan created by the system plan proposal formulating module 112: information relating to power flow states such as the active power, reactive power, voltage, current, and phase of the power transmission system that are calculated by the power transmission system evaluation module 33; information relating to power quality such as an amount of power transmission loss, a voltage deviation amount, and a frequency deviation; and information on a supply reliability level of the power transmission system.

The system state data 143 includes electrical state data 144, facility state data 145, and failure data 146. The electrical state data 144 includes pieces of electrical state data such as the voltage, phase, active power, and reactive power of the power transmission facility in the power system 5 that are measured by the measuring instrument 52. The facility state data 145 includes information indicating management states of the power transmission facility, such as years of service and maintenance history information. The failure data 146 includes a past failure history in the power transmission facility and estimated values of a failure rate and a failure time period of the power transmission facility that are estimated by a failure mode model.

<Power Distribution System Management Apparatus>

The power distribution system recording unit 43 includes system configuration data 151, power distribution system evaluation data 152, and system state data 153. The system configuration data 151 includes specification data on facilities such as overhead power distribution lines, underground power distribution lines, buses, transformers, switches, and phase modifying facilities, positional information on those facilities, and information indicating connection relationships therebetween. In addition, the power distribution system recording unit 43 includes loads (for example, number of downstream customers, current value, active power, and reactive power) for each load point (for example, pole transformer) of the power distribution system; and information relating to costs of the power distribution system, for example, information for calculating an operation cost, a maintenance cost, a construction cost, and the like of each facility.

The power distribution system evaluation data 152 includes, for a system plan created by the system plan proposal formulating module 112: information relating to power flow states such as the active power, reactive power, voltage, current, and phase of the power distribution system that are calculated by the power distribution system evaluation module 42; information relating to power quality such as an amount of power transmission loss and a voltage deviation amount; and information on a supply reliability level of the power distribution system.

The system state data 153 includes electrical state data 154, facility state data 155, and failure data 156. The electrical state data 154 includes pieces of electrical state data such as the voltage, phase, active power, and reactive power of the power distribution facility in the power system 5 that are measured by the measuring instrument 52. The facility state data 155 includes information indicating management states of the power distribution facility, such as years of service and maintenance history information. The failure data 156 includes a past failure history in the power distribution facility and estimated values of a failure rate and a failure time period of the power distribution facility that are estimated by a failure mode model.

<Example of Creating Facility Discontinuance Plan in At Least One Embodiment>

Figure 2:
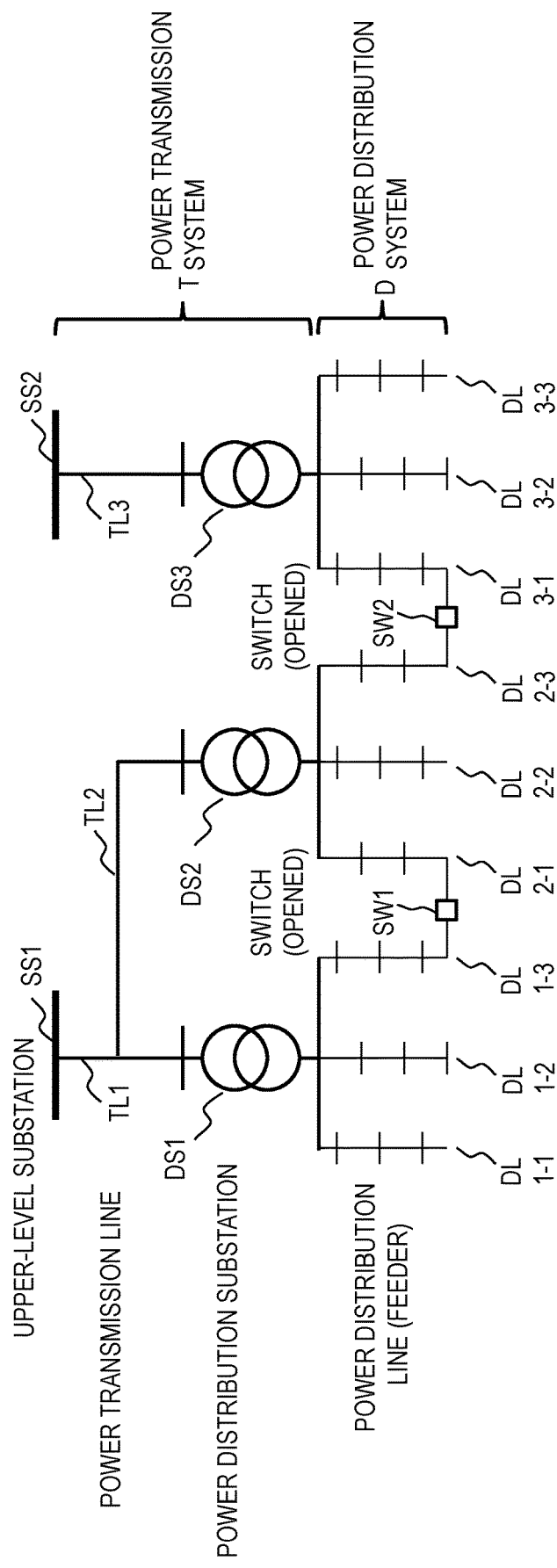
FIG. 2 is a diagram for illustrating an example of a power system model.

FIG. 2 is an illustration of a model that imitates a general power system. A power transmission system is generally divided into a trunk transmission system and a local supply system, and the power transmission system of FIG. 2 belongs to the local supply system. The power transmission system is hereinafter assumed to refer to the local supply system unless otherwise specified. A power transmission system T is formed of upper-level substations (SS1 and SS2), power transmission lines (TL1, TL2, and TL3), power distribution substations (DS1, DS2, and DS3), and the like. A power distribution system D is formed of power distribution lines (DL1-1, DL1-2, DL1-3, DL2-1, DL2-2, DL2-3, DL3-1, DL3-2, and DL3-3), switches (SW1 and SW2), and the like, which are connected subsequent to the power distribution substations. The voltage of the power distribution system is lower than the voltage of the power transmission system. The power transmission system and the power distribution system may include other facilities.

Figure 3:
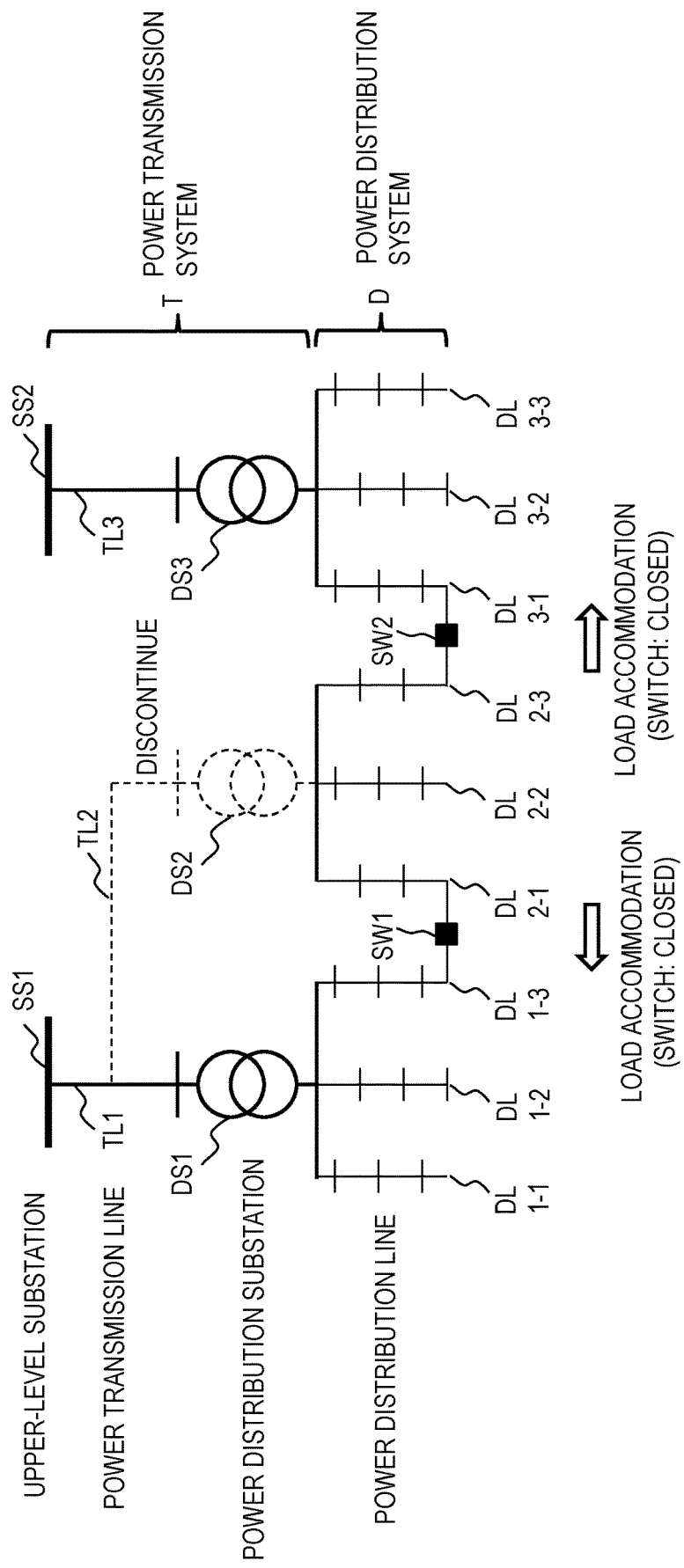
FIG. 3 is a diagram for illustrating an example of creating a facility discontinuance plan by the system planning support coordination system.

FIG. 3 is an illustration of an example of creating a system plan proposal including discontinuance of a power transmission facility in the at least one embodiment for the power system illustrated in FIG. 2. In FIG. 3, it is assumed that, when facility renewal in the power transmission system T is examined, aging of the power transmission line TL2 and the power distribution substation DS2 has exerted an adverse influence on the supply reliability level. In this case, when a facility renewal plan targeted for only the power transmission system is to be formulated, the power transmission line TL2 and the power distribution substation DS2 are required to be handled by facility replacement.

Now, with attention being given to the configuration of the power distribution system, in power distribution lines subsequent to the power distribution substation DS2, loads thereof can be accommodated by the power distribution substations DS1 and DS3 by closing the switches SW1 and SW2, respectively. In other words, as illustrated in FIG. 3, the switches are operated to cause the power distribution substations DS1 and DS3 to accommodate the loads connected to the power distribution substation DS2, to thereby discontinue the power transmission line TL2 and the power distribution substation DS2 while avoiding the facility replacement thereof.

Accordingly, it is possible to reduce facility costs supposed to have been required for the facility replacement, and also reduce labor required for maintenance work for the power transmission line TL2 and the power distribution substation DS2. However, there is a limit to the load amount that can be accommodated between the power distribution substations. In the at least one embodiment, the load accommodation capacity represents a load amount that can be accommodated between facilities, and also represents a power supply capacity that can be compensated for between the facilities. In the at least one embodiment, the load accommodation capacity that can be accommodated between the power distribution substations through a change in system configuration of the power distribution system based on operations of the switches is calculated. In the at least one embodiment, the load accommodation capacity calculation module 111 calculates the load accommodation capacity.

<System Planning Support Coordination System: Overall Processing Flow>

Figure 4:
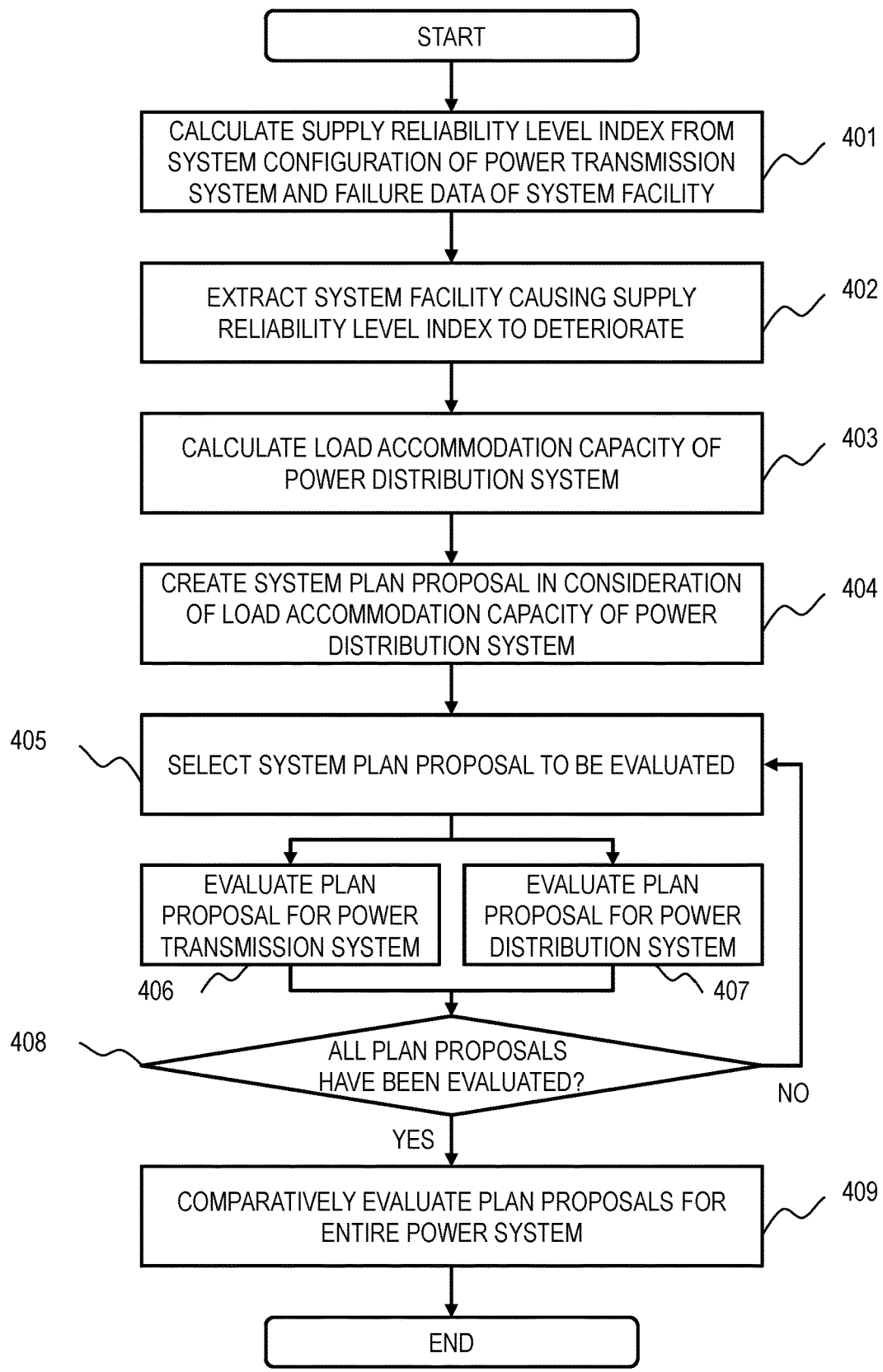
FIG. 4 is a flow chart for illustrating an overall processing flow of the system planning support coordination system.

FIG. 4 is a flow chart for illustrating an overall processing flow of the system planning support coordination system 1. This processing flow is started by being triggered when the system planning support coordination apparatus 2 receives a creation request for a system plan proposal from the input unit 23, and comparative evaluation results of system plan proposals are output to the output unit 24 to complete the processing. The following description is given of an overview of creation and evaluation of system plan proposals based on this processing flow, followed by details of each processing steps.

First, when a request for creating a system plan is received, in Step 401, a supply reliability level index of the power transmission system is calculated based on a system configuration of the power transmission system and a failure parameter of a system facility. Subsequently, in Step 402, a degree of influence of each power transmission facility to be exerted on the supply reliability level index calculated in Step 401 is calculated, and a facility causing a value of the supply reliability level index to deteriorate is extracted. The facility extracted in this manner is set as a countermeasure facility for the system plan proposal.

Step 401 and Step 402 are processed by the countermeasure facility extraction module 32 executing the processing based on the information of the power transmission system recording unit 34 and recording processing results in the countermeasure facility data 131 through a communication network. In regard to the extraction of the countermeasure facility in Step 402, all facilities in which the degree of influence to be exerted on the supply reliability level index exceeds a predetermined threshold value may be extracted, or a facility to be set as the countermeasure facility may be selected by the input unit 23.

In Step 403, the load accommodation capacity between power distribution substations is calculated from the countermeasure facility and the configuration of the power distribution system. Step 403 is executed by the load accommodation capacity calculation module 111 reading the information of the power distribution system recording unit 43 through the communication network to calculate the load accommodation capacity between power distribution substations and recording the load accommodation capacity in the load accommodation capacity data 132.

Subsequently, in Step 404, a system plan proposal including discontinuance of the countermeasure facility is created in consideration of the load accommodation capacity of the power distribution system. In the at least one embodiment, the system plan proposal includes a discontinuance plan of a power transmission facility and a switch operation plan for the power distribution system based on the load accommodation capacity. The system plan proposal may include the discontinuance or renewal (regardless of increase or decrease in capacity) of a single countermeasure facility, or may include the discontinuance or renewal of a plurality of countermeasure facilities. In addition, when the discontinuance of the countermeasure facility is included, in order to comparatively examine effects of countermeasures, a renewal plan proposal may be simultaneously created. Step 404 is executed by the system plan proposal formulating module 112 creating a plan proposal and recording the plan proposal in the plan proposal data 133.

In Step 405, one system plan proposal is selected from among the created system plan proposals, and is set as a subject to be evaluated. Subsequently, in Step 406 and Step 407, degrees of influence of the selected system plan proposal on the power transmission system and the power distribution system are evaluated. The degrees of influence of the system plan proposal are evaluated in terms of, for example, cost efficiency and/or power supply reliability.

The degree of influence in terms of the cost efficiency can be calculated from items, for example, an operation cost, a maintenance cost, and a construction cost required for facility renewal or discontinuance. As the degree of influence in terms of the power supply reliability, for example, the power flow states such as the active power, reactive power, voltage, current, and phase of a system, the power quality such as the amount of power transmission loss, the voltage deviation amount, and the frequency deviation, or the supply reliability level index of the system may be evaluated, or other items may be evaluated.

In Step 408, it is examined whether or not evaluation has been performed for all system plan proposals. When there are system plan proposals that have not yet been evaluated, the processing steps of from Step 405 to Step 407 are repeated for the remaining system plan proposals again. When all the system plan proposals have been evaluated, the flow advances to Step 409. Step 406 is executed by the power transmission system evaluation module 33, and the evaluation result is recorded in the power transmission system evaluation data 142. Step 407 is executed by the power distribution system evaluation module 42, and the evaluation result is recorded in the power distribution system evaluation data 152.

In Step 409, the evaluation results of the system plan proposals for the power transmission system and the power distribution system are aggregated to generate a comprehensive evaluation result, and the system plan proposals for the entire power system are comparatively evaluated. Thus, it is possible to recognize influences of the system plans on the entire power system. In the comparative evaluation, comprehensive evaluation is performed in terms of a plurality of items, and the evaluation results are visualized. For example, evaluation may be performed through use of two items of the cost efficiency and the reliability, and the evaluation results may be plotted on a two-axis graph of the cost efficiency and the reliability.

Step 409 is executed by the system plan proposal comparative evaluation module 113 reading the power transmission system evaluation data 142 and the power distribution system evaluation data 152 through the communication network. The comparative evaluation results after the execution of Step 409 are output by the output unit 24. In addition, pieces of evaluation data on the entire system after the execution of Step 409 are recorded in the plan proposal evaluation data 134. After the execution of Step 409, the evaluation results are output, and the processing is ended.

<Power Transmission System Management Apparatus: Countermeasure Facility Extraction Flow>

Details of Step 401 and Step 402 are described. A procedure of calculating the supply reliability level in the at least one embodiment is described below. A facility in a power transmission system against which countermeasures are to be taken is determined based on failure information on the power transmission system.

As supply reliability level indices in the at least one embodiment, a system average interruption frequency index (SAIFI) being an index of the number of power failures and a system average interruption duration index (SAIDI) being an index of a time period of a power failure are used. The SAIFI and the SAIDI are expressed as indices per customer in a predetermined period, but in the at least one embodiment, units of times/year are used for the SAIFI, and units of hours/year are used for the SAIDI. Through use of those two indices, the supply reliability level can be appropriately evaluated. Other types of indices can be used as the indices of the supply reliability level.

In calculating the supply reliability level of a power system, the power system is regarded as a system having a network structure. In general reliability engineering, when the reliability of a certain system is evaluated, a failure rate A representing the number of failures per unit time, an average recovery time period r per failure, and an average failure time period U within a predetermined period, in the certain system are used as parameters for calculating the reliability of the target system. Those three parameters are hereinafter referred to as "failure parameters."

With attention being given to a single facility, the failure parameters can be estimated based on the number of years of use and a degree of deterioration. When a system including two or more elements (facilities) is assumed, it is required to calculate the failure parameters of the entire system in consideration of not only the failure parameters of the elements (facilities) per se but also how the elements are connected to each other. In order to distinguish such failure parameters, the failure parameters of the entire system are referred to as "equivalent failure parameters." For example, the equivalent failure parameters obtained when two certain elements are connected in series are calculated by, for example, the following expressions.

$$\lambda_{se} = \lambda_1 + \lambda_2$$

$$r_{se} = (\lambda_1 r_1 + \lambda_2 r_2 + \lambda_1 r_1 \lambda_2 r_2)/\lambda_{se}$$

$$U_{se} = \lambda_{se} r_{se} \quad \text{[Expression 1]}$$

where $\lambda_{se}$ represents an equivalent failure rate in an upstream series connection system, $\lambda_1$ and $\lambda_2$ represent failure rates of series elements, $r_{se}$ represents an equivalent failure recovery time period in the series connection system, $r_1$ and $r_2$ represent failure recovery time periods of the series elements, and Use represents an equivalent failure time period in the series connection system. In addition, the equivalent failure parameters obtained when two certain elements are connected in parallel are calculated by, for example, the following expressions.

$$\lambda_{pe} = (\lambda_1 \lambda_2 (r_1 + r_2))/(1 + \lambda_1 r_1 + \lambda_2 r_2)$$

$$r_{pe} = r_1 r_2/(r_1 + r_2)$$

$$U_{pe} = \lambda_{pe} r_{pe} \quad \text{[Expression 2]}$$

where $\lambda_{pe}$ represents an equivalent failure rate in an upstream parallel connection system, $\lambda_1$ and $\lambda_2$ represent failure rates of parallel elements, $r_{pe}$ represents an equivalent recovery time period in the parallel connection system, $r_1$ and $r_2$ represent failure recovery time periods of the parallel elements, and $U_{pe}$ represents an equivalent failure time period in the parallel connection system.

A general electric power system includes a large number of devices, and hence the equivalent failure parameters are calculated by combining Expression 1 and Expression 2 as a system formed of a plurality of series-parallel mixed devices. Those equivalent failure parameters are used to calculate the SAIFI and the SAIDI by the following expressions.

$$\text{SAIFI} = \Sigma \lambda_i N_i / \Sigma N_i \quad \text{[Expression 3]}$$

where $\lambda_i$ represents an equivalent failure rate (power failure occurrence probability) at a load point i, and $N_i$ represents the number of customers connected to a downstream load point i.

$$\text{SAIDI} = \Sigma U_i N_i / \Sigma N_i \quad \text{[Expression 4]}$$

where $U_i$ represents a failure time period (power failure time period) at a load point i, and $N_i$ represents the number of customers connected to a downstream load point i.

Figure 5:
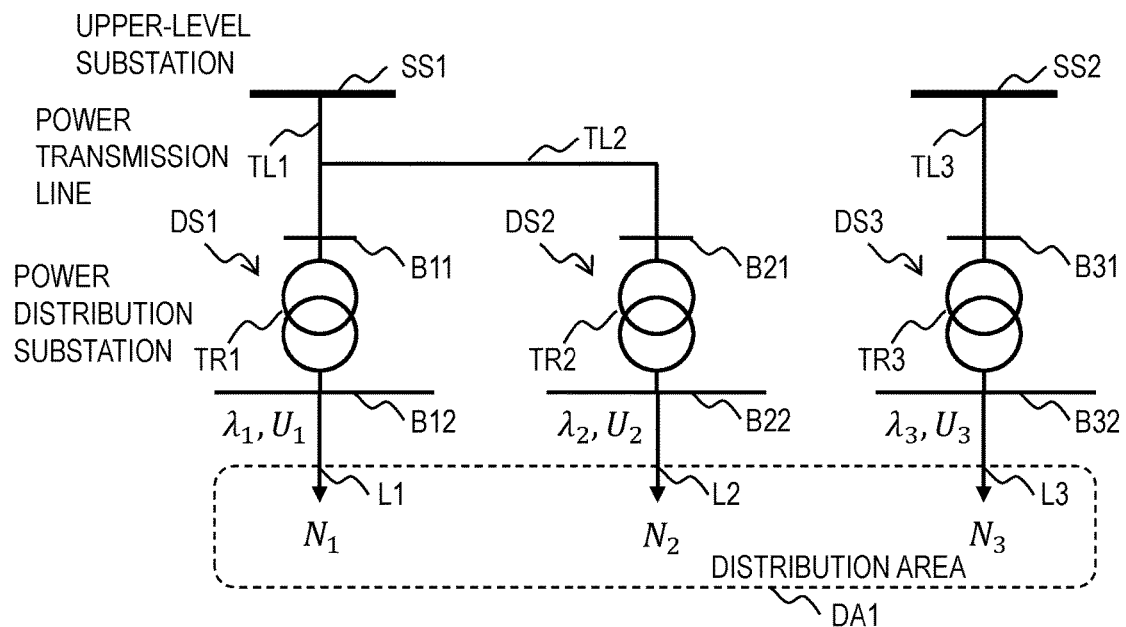
FIG. 5 is a diagram for illustrating an example of calculating a supply reliability level index of a power transmission system.

The above-mentioned procedure of calculating the supply reliability level index is specifically described with a system model of FIG. 5 being used as an example. FIG. 5 is an illustration of a system model for illustrating a target range of the power transmission system in the power system of FIG. 2. In addition to the system model illustrated in FIG. 2, primary-side buses B11, B21, and B31, transformers TR1, TR2, and TR3, and secondary-side buses B12, B22, and B32 are illustrated as facilities that form the respective power distribution substations. In addition, load groups L1, L2, and L3 are illustrated as being connected downstream of the respective power distribution substations, and power distribution systems subsequent to the power distribution substations DS1 to DS3 are collectively indicated as a distribution area DA1.

In order to obtain the SAIFI and the SAIDI, the equivalent failure parameters at load points are required. In FIG. 5, the buses B12, B22, and B32 to which the load groups L1, L2, and L3 are connected correspond to the load points. For example, an equivalent failure rate $\lambda_1$ and an equivalent failure time period $U_1$ of the bus B12 are calculated based on the respective failure parameters of the system facilities (power transmission line TL1, bus B11, transformer TR1, and bus B12) connected subsequent to the upper-level substation SS1 up to the bus B12.

As the failure parameters of the system facilities, estimated values of the failure parameters recorded in the failure data 146 are used. Equivalent failure rates and equivalent failure time periods of the buses B22 and B32 can also be calculated in the same manner. In this case, when the numbers of customers in the load groups L1 to L3 are set as $N_1$ to $N_3$, the SAIFI and the SAIDI of the distribution area DA1 can be calculated by the following expressions.

$$\text{SAIFI} = (\lambda_1 \lambda_1 + \lambda_2 N_2 + \lambda_3 N_3)/(N_1 + N_2 + N_3)$$

$$\text{SAIDI} = (U_1 N_1 \pm U_2 N_2 + U_3 N_3)/(N_1 + N_2 + N_3)$$

Figure 6:
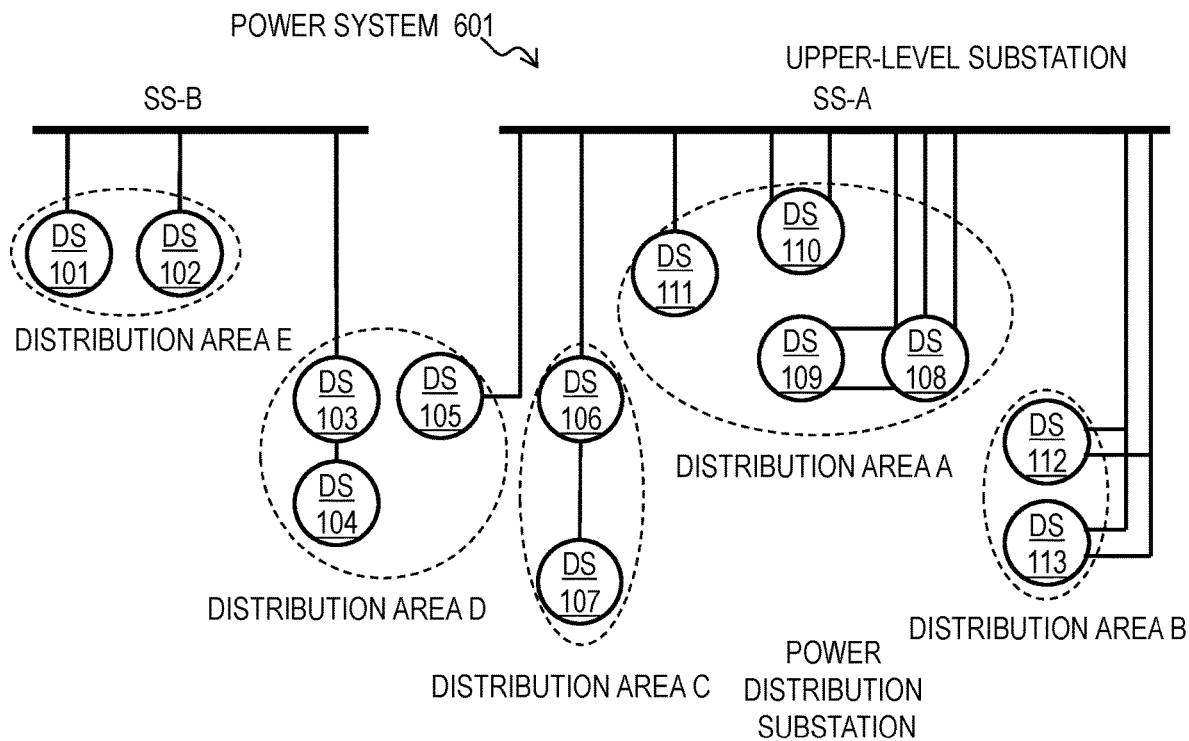
FIG. 6 is a diagram for illustrating an example of a power system.

Next, the extraction of a system facility causing the supply reliability level index to deteriorate in Step 402 is described with reference to an example of a general power system (power system 601) illustrated in FIG. 6. It is assumed that the power system 601 is formed of upper-level substations SS-A and SS-B and power distribution substations DS101, DS102, DS103, DS104, DS105, DS106, DS107, DS108, DS109, DS110, DS111, DS112, and DS113, and the power distribution system is managed by five distribution areas A, B, C, D, and E.

FIG. 7 is a table for showing an example of a supply reliability level index table 700 that shows results of calculating the SAIFI and the SAIDI for the distribution areas A to E of the power system 601. The countermeasure facility extraction module 32 performs calculation as described above to calculate the SAIFI and the SAIDI for each distribution area. The countermeasure facility extraction module 32 identifies an area against which countermeasures are to be taken based on values of the SAIFI and the SAIDI. In the supply reliability level index table 700, the SAIFI and the SAIDI of the distribution area A have higher values than those of the other areas. In order to identify a cause thereof, the equivalent failure parameters of the power distribution substations that form the distribution area A are examined.

In this manner, the supply reliability level of each distribution area of a plurality of distribution areas is determined based on the information on failures and the information on loads of the power distribution substations included in each distribution area, and a distribution area against which countermeasures are to be taken is determined based on the supply reliability levels of the distribution areas. For example, the countermeasure facility extraction module 32 may select, as a countermeasure area, a distribution area in which a deviation of the value of the SAIFI or SAIDI from an average value exceeds a threshold value, or may select, as a countermeasure area, a distribution area in which the value of the SAIFI or SAIDI exceeds a threshold value set therefor in advance.

In another example, a distribution area in which the value of the SAIFI or SAIDI exceeds a threshold value may be selected as a countermeasure area. A distribution area against which countermeasures are to be taken can be appropriately determined based on the downstream loads (number of customers). The selection of a distribution area against which countermeasures are to be taken may be omitted, and a power distribution substation against which countermeasures are to be taken may be determined based on the failure information on the power distribution substations in all the distribution areas.

FIG. 8 is a table for showing an example of a power distribution substation equivalent failure parameter table 800 that is generated by the countermeasure facility extraction module 32. In this example, the power distribution substation equivalent failure parameter table 800 shows the number of connected customers and the equivalent failure parameters of the power distribution substations DS108 to DS111 that form the distribution area A. The countermeasure facility extraction module 32 identifies a power distribution substation against which countermeasures are to be taken based on the equivalent failure rates and the equivalent failure time periods. A power distribution substation against which countermeasures are to be taken can be appropriately determined based on the failure information on the power distribution substations.

In the power distribution substation equivalent failure parameter table 800, the equivalent failure rate and the equivalent failure time period of the power distribution substation DS110 exhibit high numerical values. Therefore, in order to improve the SAIFI and the SAIDI of the distribution area A, it is required to take countermeasures against a facility in the power distribution substation DS110 that causes the equivalent failure parameters thereof to deteriorate. In this manner, a power distribution substation against which countermeasures are to be taken is determined based on the failure information on the power distribution substations. For example, the countermeasure facility extraction module 32 may select, as a countermeasure power distribution substation, a power distribution substation in which the equivalent failure rate or the equivalent failure time period exceeds a threshold value.

FIG. 9 is a table for showing an example of a degree-of-influence-on-equivalent-failure-parameter table 900 that is generated by the countermeasure facility extraction module 32. In this example, the degree-of-influence-on-equivalent-failure-parameter table 900 shows the degree of influence of each system facility on the equivalent failure rate and the equivalent failure time period of the power distribution substation DS110. The information on the facilities that exert influences on the equivalent failure parameters of the power distribution substation is set in advance in, for example, the system configuration data 141 and the system state data 143.

The countermeasure facility extraction module 32 identifies a facility causing the SAIFI and the SAIDI to deteriorate based on the information of the degree-of-influence-on-equivalent-failure-parameter table 900, and extracts the facility as a countermeasure facility. The information of the degree-of-influence-on-equivalent-failure-parameter table 900 includes, for example, an ID 901, a facility name 902, a failure rate 903, a degree 904 of influence of the failure rate, a failure time period 905, a degree 906 of influence of the failure time period, and years 907 of service, and are renewed as occasion arises.

The ID 901 identifies a system facility. The facility name 902 identifies a type of the system facility. The failure rate 903 indicates the failure rate of the system facility per se. The degree 904 of influence of the failure rate indicates the degree of influence of the failure rate 903 on the equivalent failure rate of the power distribution substation. The degree 904 of influence of the failure rate is represented by, for example, a value obtained by dividing the value of the failure rate 903 by the equivalent failure rate. The failure time period 905 indicates the failure time period of the system facility per se.

The degree 906 of influence of the failure time period indicates the degree of influence of the failure time period 905 on the equivalent failure time period of the power distribution substation. The degree 906 of influence of the failure time period can be represented by, for example, a value obtained by dividing the failure time period 905 by the equivalent failure time period. In the example of FIG. 9, sorting is performed in descending order of the degree 904 of influence of the failure rate, but sorting may be performed by another column item.

In the at least one embodiment, it is assumed that transformers TR1101 and TR1102 and a bus B1101 that form the power distribution substation DS110 have high degrees of influence on the failure rate due to aging. In this case, the transformers TR1101 and TR1102 and the bus B1101 are recorded in the countermeasure facility data 131 as countermeasure facilities. For example, the countermeasure facility extraction module 32 can select, as a countermeasure facility, a facility in which the degree of influence on the failure rate exceeds a threshold value. In this manner, a facility against which countermeasures are to be taken is selected from facilities of the power transmission system that exert influences on failures of the power distribution substation against which countermeasures are to be taken.

At this time, the equivalent failure parameter is recorded in association with the information on the power distribution substation DS110 to be improved as well. In regard to the extraction of countermeasure facilities, all facilities in which the items of from the failure rate 903 to the years 907 of service exceed predetermined threshold values may be extracted, or countermeasure facilities may be extracted based on one parameter different from the degree of influence on the failure rate. As described later, when a power distribution substation can be discontinued, all facilities that can be discontinued along with the discontinuance of the power distribution substation may be extracted. In another example, the user may select a countermeasure facility. The user selects a countermeasure facility through the input unit 23 based on information on the items of from the ID 901 to the years 907 of service that are output by the output unit 24.

The supply reliability level index table 700, the power distribution substation equivalent failure parameter table 800, and the degree-of-influence-on-equivalent-failure-parameter table 900 are recorded in the failure data 146.

<System Planning Support Coordination Apparatus: Load Accommodation Capacity Calculation Flow>

Figure 10:
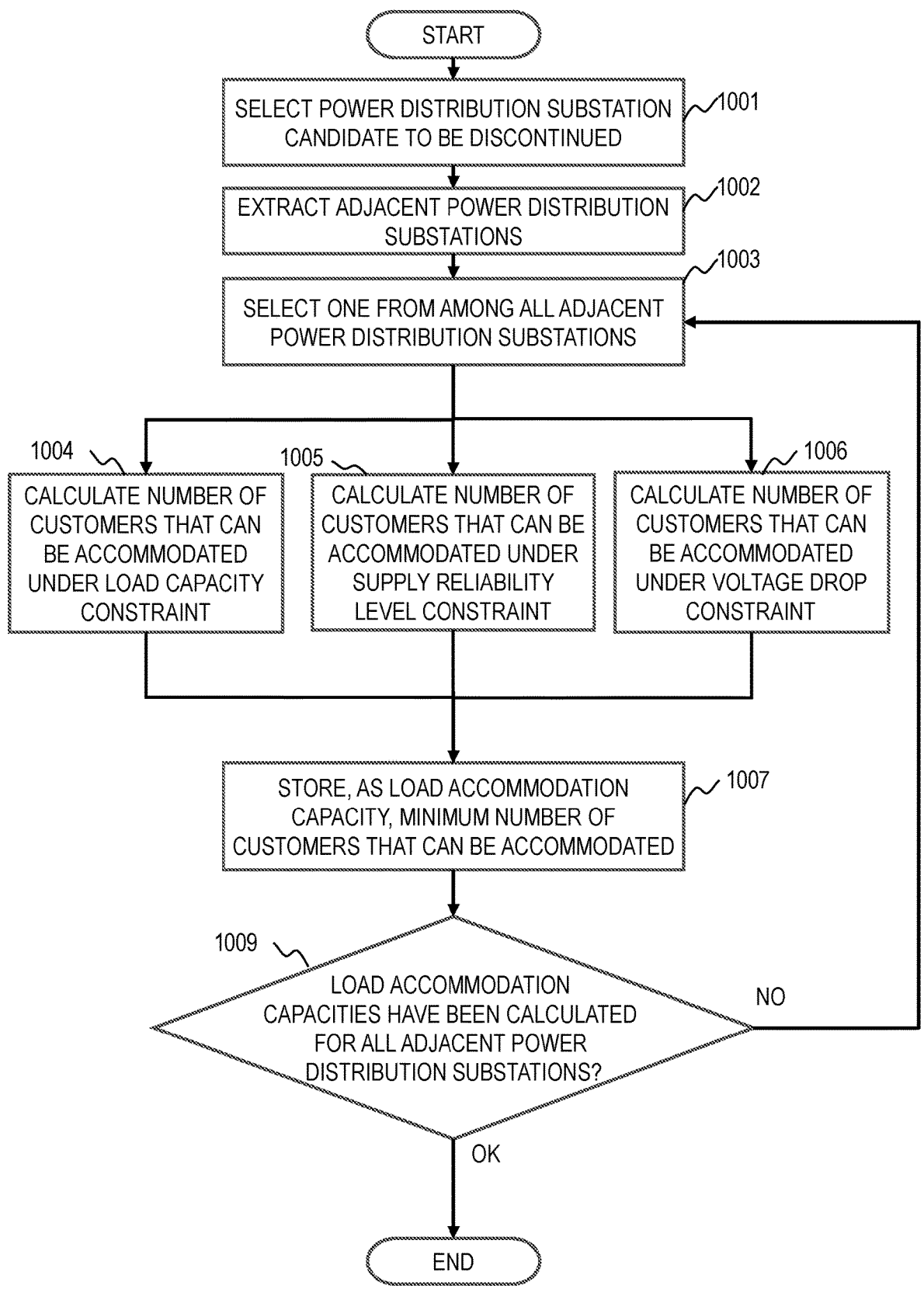
FIG. 10 is a flow chart for illustrating a flow of calculating a load accommodation capacity by a system planning support coordination apparatus.

Details of Step 403 executed by the load accommodation capacity calculation module 111 are described with reference to FIG. 10. A load accommodation capacity calculation flow is described below by taking discontinuance of the power distribution substation DS110 in the power system 601 as an example. When a power distribution substation against which countermeasures are to be taken can be discontinued from the viewpoint of the load accommodation capacity, it is possible to greatly reduce the cost by discontinuing the power distribution substation. Countermeasures may be executed only on countermeasure facilities extracted from facilities relating to the power distribution substation DS110. For example, the countermeasure facilities can be discontinued or renewed. It is possible to reduce (partially discontinue) the power distribution substation DS110 by discontinuing some of the facilities of the power distribution substation DS110.

First, in Step 1001, a power distribution substation candidate to be discontinued is selected. At this time, the information on the power distribution substation associated with the countermeasure facility data 131 is referred to. In this example, the load accommodation capacity calculation module 111 selects the power distribution substation DS110 as a candidate to be discontinued.

Subsequently, in Step 1002, other power distribution substations adjacent to the power distribution substation selected in Step 1001 are extracted. Specifically, the load accommodation capacity calculation module 111 reads the system configuration data 151 of the power distribution system recording unit 43 through the communication network, and extracts the power distribution substations having power distribution lines connected to the power distribution substation DS110. In this case, the power distribution substations adjacent to the power distribution substation DS110 are the power distribution substations DS108, DS109, and DS111.

Subsequently, in Step 1003, one power distribution substation for which the load accommodation capacity is calculated is selected from among all the adjacent power distribution substations. There are three power distribution substations that are adjacent to the power distribution substation DS110, but the power distribution substation DS108 is first described as an example.

Figure 11:
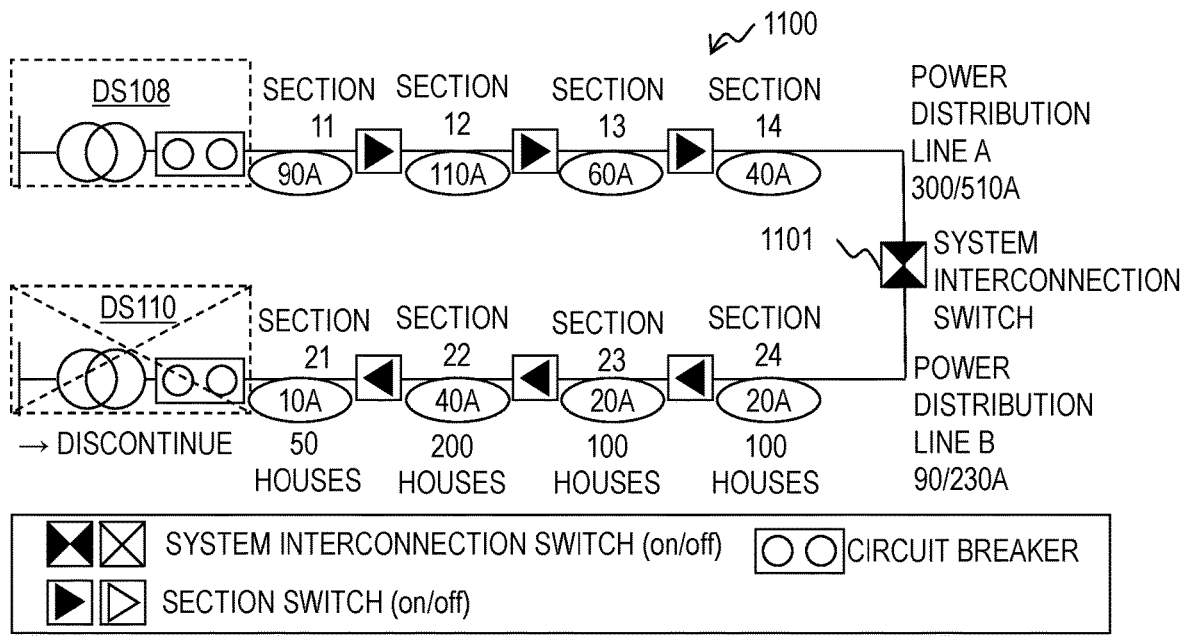
FIG. 11 is a diagram for illustrating an example of load accommodation in a power distribution system.

Load accommodation to be performed through system switching is described with reference to a power distribution system 1100 of FIG. 11. The power distribution system 1100 is a system connected to the power distribution substations DS108 and DS110. In general, a power distribution system is divided into a plurality of sections by a system interconnection switch and section switches, and loads (customers) are connected to each section. In a normal state, a system interconnection switch 1101 that connects power distribution lines A and B in the power distribution system 1100 is opened at all times, and the two power distribution lines are operated in a state of being electrically disconnected from each other.

At this time, when the discontinuance of the power distribution substation DS110 is examined for the power distribution system 1100, the power distribution line B no longer has a power supply source, and hence it is required to close the system interconnection switch 1101 to cause the power distribution line A to accommodate the loads. In that case, how many sections (loads) can be accommodated by the power distribution line A is calculated as the load accommodation capacity.

In other words, the value of the load accommodation capacity can be expressed as the number of customers that can be accommodated by the adjacent power distribution substation through system switching of the power distribution system among customers (loads) connected to the power distribution substation candidate to be discontinued. In the at least one embodiment, the load accommodation capacity is calculated under three constraints of the load capacity, the supply reliability level of the power distribution system, and the voltage. Those enable an appropriate load accommodation capacity to be calculated. The constraints are not limited to those three constraints, and the load accommodation capacity may be calculated by using only some of those or by using or adding another constraint.

First, in Step 1004, the switchable load amount calculation module 121 calculates the number of customers that can be accommodated between the power distribution substations under the load capacity constraint. For example, a current capacity of a power distribution line is used as the load capacity in the at least one embodiment. It is assumed that, in the power distribution system 1100, a load of 300 amperes is connected to the power distribution line A having a current capacity of 510 amperes, and a load of 90 amperes is connected to the power distribution line B having a current capacity of 230 amperes. At this time, the number of customers corresponding to an unused capacity of 210 amperes of the power distribution line A is the number of customers that can be accommodated. Assuming that the load of the power distribution line B to be accommodated is 0.2 ampere per house, the maximum number of customers that can be accommodated by the power distribution line A is 1,050 houses. In other words, from the viewpoint of the load capacity, all the loads connected to the power distribution line B can be accommodated by the power distribution line A.

In Step 1005, the power distribution system reliability level calculation module 122 calculates the number of customers that can be accommodated between the power distribution substations under the reliability level constraint. The supply reliability level of the power distribution system can be calculated in the same procedure as that of Step 401. Specifically, the equivalent failure parameter of each section is calculated based on the failure parameter of each power distribution facility that forms the power distribution system.

Figure 12:
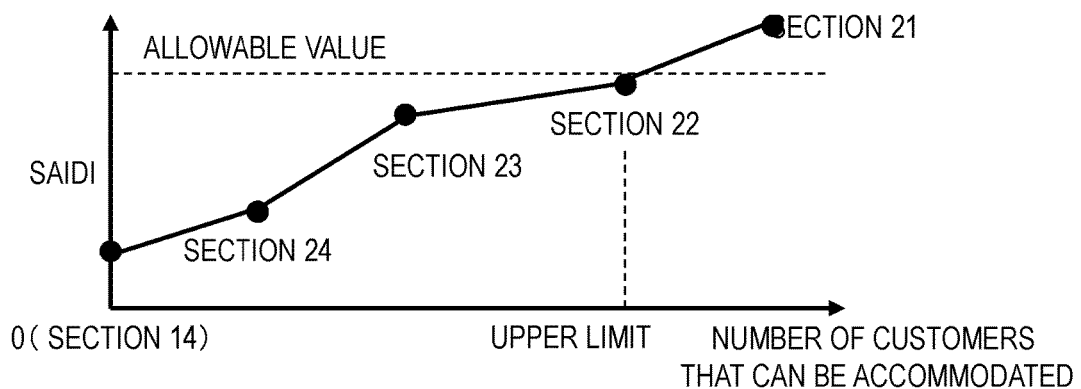
FIG. 12 is a graph for showing an example of calculating the number of customers that can be accommodated under a supply reliability level constraint.

The supply reliability level index can be calculated based on the equivalent failure parameter of each section and the number of customers connected to each section. FIG. 12 is a graph for showing an example of a change in the SAIDI exhibited when sections 21 to 24 of the power distribution line B are accommodated by the power distribution line A one section at a time in the power distribution system 1100. The supply reliability level index may be the SAIFI or another index. Further, the minimum number of customers that can be accommodated may be selected through calculation in terms of a plurality of indices.

In a power distribution system, facilities are basically connected in series, and in accordance with Expression 1, as the number of connected facilities (sections) becomes larger, the equivalent failure parameter becomes larger as well. Therefore, as the sections to be accommodates are increased, the value of the SAIDI also increases. At this time, with a predetermined allowable value (threshold value) of the SAIDI being set in advance, sections below the allowable value can be accommodated. In FIG. 12, under the reliability level constraint, the sections up to section 22 can be accommodated by the power distribution line A, and the total number of customers connected from the section 24 to the section 22, which is 400 houses, is the number of customers that can be accommodated.

Figure 13:
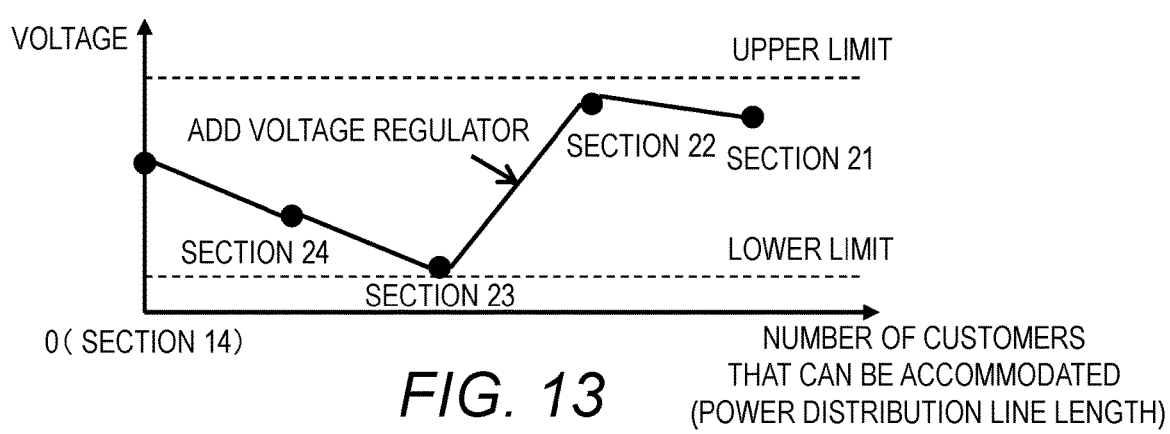
FIG. 13 is a graph for showing an example of calculating the number of customers that can be accommodated under a voltage drop constraint.

In Step 1006, the voltage calculation module 123 calculates the number of customers that can be accommodated between the power distribution substations under the voltage constraint. In a power distribution system having no reverse power flow from a terminal end side, a voltage on an upstream side (substation side) is high, and the voltage becomes lower toward the terminal end. The power distribution system is operated so that the voltage values fall within a predetermined range through adjustment of a voltage to be sent out from the power distribution substation or addition of a voltage regulator to a power distribution line. FIG. 13 is a graph for showing an example of a voltage value exhibited for each section when the sections 21 to 24 of the power distribution line B are accommodated by the power distribution line A in the power distribution system 1100. The voltage calculation module 123 generates information indicated by this graph and calculates, based on the generated information, the number of customers that can be load-accommodated.

When the loads are accommodated by the power distribution line A, a power distribution line length (distance from the power distribution substation to the terminal end) increases, and the voltage is lowered. In FIG. 13, the voltage becomes closer to a lower limit value up to the section 23. However, through the addition of a voltage regulator between the sections 22 and 23, the voltage values of from the sections 22 to 21 also fall within the predetermined range. All the sections of the power distribution line B can be accommodated by the power distribution line A, and hence the total number of customers that can be load-accommodated under the voltage constraint is 450 houses. The system planning support coordination system 1 may hold in advance information regarding whether or not a voltage regulator is allowed to be added to each section of the power distribution system, and may identify a section in which a voltage regulator can be installed and a section in which a voltage regulator cannot be installed. The load amount that can be accommodated under the voltage constraint is calculated based on that information.

In the above-mentioned example, in the processing steps of from Step 1004 to Step 1006, the load accommodation capacity is calculated by assuming loads in one certain slice of the power distribution system. The "one slice" as used herein refers to, for example, a load state of the power distribution system in a peak power demand forecast. The number of slices of the power distribution system to be used for calculating the load accommodation capacity is not limited to one slice. For example, a value obtained by averaging load accommodation capacities for a plurality of forecast system slices during a freely-set period may be used.

Subsequently, in Step 1007, the minimum value among the numbers of customers that can be accommodated under the load capacity constraint, the supply reliability level constraint, and the voltage constraint is determined as the load accommodation capacity. In regard to the power distribution substation DS110 being the candidate to be discontinued, the numbers of customers that can be accommodated by the power distribution substation DS108 are 1,050 houses under the load capacity constraint, 400 houses under the supply reliability level constraint, and 450 houses under the voltage constraint. Therefore, the minimum number, that is, 400 houses being the number of customers that can be accommodated under the supply reliability level constraint, is determined as the load accommodation capacity of the power distribution substation DS108. In the at least one embodiment, the load accommodation capacity is described by taking the number of customers as the unit, but any unit of power capacity or power amount may be used.

Finally, in Step 1009, the load accommodation capacity calculation flow is completed when the load accommodation capacities have been calculated for all the adjacent power distribution substations, and when there is an adjacent power distribution substation for which the calculation has not yet been finished, the processing steps of from Step 1003 to Step 1007 are repeated. FIG. 14 shows an example 1400 of calculating the load accommodation capacity for each power distribution substation adjacent to the power distribution substation DS110. Results of calculating the load accommodation capacities are stored in the load accommodation capacity data 132.

<System Planning Support Coordination Apparatus: System Plan Proposal Creation Flow>

A procedure of creating a system plan proposal in consideration of the load accommodation capacity of the power distribution system in Step 404 is described by taking the discontinuance of the power distribution substation DS110 as an example. The number of connected customers of the power distribution substation DS110 is 720 houses, and hence, with reference to the load accommodation capacity calculation example 1400, even when the power distribution substation DS110 is discontinued, the demand can be covered through the load accommodation by the adjacent power distribution substations. In view of this, the system plan proposal formulating module 112 creates a discontinuance plan proposal for the discontinuance of the power distribution substation DS110.

The discontinuance plan proposal includes a change in system configuration of the power distribution system. In the at least one embodiment, for example, the loads are allocated based on a ratio of the load accommodation capacity among the respective adjacent power distribution substations. With the number of connected customers of the power distribution substation DS110 being 720 houses, the system plan proposal formulating module 112 determines, based on the load accommodation capacity calculation example 1400, a method of operating the switches in the power distribution system so that the power distribution substation DS108 accommodates 200 houses and the power distribution substations DS109 and DS111 each accommodate 260 houses. For example, the load amount to be actually accommodated can be determined based on the ratio of the load accommodation capacity among the adjacent power distribution substations. In this example, a ratio of the number of accommodated houses substantially matches the ratio of the load accommodation capacity.

Now, a data example of a discontinuance proposal of the power distribution substation DS110 is shown in FIG. 15 as a system plan proposal 1500. The system plan proposal 1500 is formed of a countermeasure site 1501 in the power transmission facility and a switch operation 1502 for the power distribution system. As the countermeasure sites in the power transmission system, all the facilities belonging to the power distribution substation DS110 are set to discontinuance. As the switch operation for the power distribution system, information on switch operation states (close or open) is specified so as to achieve the numbers of accommodated customers.

After the creation of the discontinuance plan proposal, a renewal plan of the power distribution substation DS110 is also created for comparison. In the renewal plan, facilities to be renewed are determined based on the countermeasure facility data 131. After the system plan proposal is created, the system plan proposal is stored in the plan proposal data 133.

<System Planning Support Coordination Apparatus: System Plan Proposal Evaluation Flow>

A procedure of evaluating the system plan proposal in the processing steps of from Step 405 to Step 409 is described by taking the discontinuance proposal and renewal proposal of the power distribution substation DS110 as an example. The system plan proposal is evaluated by the power transmission system evaluation module 33 and the power distribution system evaluation module 42 for each individual system of the power transmission system and the power distribution system. This enables appropriate evaluation using individually managed pieces of information on the power transmission system and the power distribution system. After that, summation is finally performed as the evaluation of the entire system.

In the at least one embodiment, the degree of influence of the system plan proposal is evaluated in terms of the two axes of the cost efficiency and the reliability. This enables more appropriate evaluation. The evaluation may be performed in terms of only one of those axes or from another aspect. For the cost efficiency, for example, the operation cost, the maintenance cost, and the construction cost required for the facility renewal or discontinuance in the power system to which the system plan proposal is applied may be used as calculation items, or other cost items may be included. As the reliability, the supply reliability levels of the power transmission system and the power distribution system are used, for example, the SAIFI or the SAIDI may be used, or other supply reliability level indices may be used.

In the evaluation of the cost efficiency, for example, an average annual cost obtained by summing up the operation cost, the maintenance cost, and the construction cost required for the facility renewal or discontinuance in the power system to which the system plan proposal is applied may be used, or other cost items may be used. The operation cost can be calculated by performing an operation simulation using a system model that employs the system plan proposal. In the operation simulation, power flow analysis of the power transmission system and the power distribution system is performed based on various kinds of input information such as power demand forecast in a predetermined period.

In the evaluation of the reliability, the SAIFI and the SAIDI are calculated by calculating equivalent failure parameters in system models of the power transmission system and the power distribution system when the system plan proposal is employed. Now, a calculation example of the reliability evaluation in the renewal and discontinuance plans of the power distribution substation DS110 is described.

FIG. 16 is a table 1600 for showing the supply reliability level indices before countermeasures. In the reliability 1600 before countermeasures, not only the supply reliability level indices SAIFItr (1601) and SAIDItr (1602) of the power transmission system (distribution area) but also the supply reliability level indices SAIFIdist (1603) and SAIDIdist (1604) of the power distribution system are calculated.

FIG. 17 is a table 1700 for showing the supply reliability level indices of the power distribution substation DS110 renewal proposal. Through the facility renewal, the equivalent failure rate and the equivalent failure time period of the power distribution substation DS110 are greatly improved. Therefore, SAIFItr (1701) and SAIDItr (1702) are also improved at the same time. In addition, SAIFIdist (1703) and SAIDIdist (1704) of the power distribution substation DS110 are also improved. Further, there are connections that form a network in the power distribution system within the distribution area, and hence, through the renewal of the power distribution substation DS110, SAIFIdist (1703) and SAID/dist (1704) of other power distribution substations are also improved.

FIG. 18 is a table 1800 for showing the supply reliability level indices of the power distribution substation DS110 discontinuance proposal. In the facility discontinuance as well, the power distribution substation DS110 having a high equivalent failure parameter value is no longer used, and hence SAIFItr (1801) and SAIDItr (1802) are improved. However, within the distribution area, the number of power distribution substations serving as power supply sources is reduced by one, and hence there is a possibility in that SAIFIdist (1803) and SAIDIdist (1804) of the other power distribution substations may further deteriorate than the supply reliability level index 1600 before countermeasures.

The reliability 1600 before countermeasures, the reliability 1700 of the renewal proposal, and the reliability 1800 of the discontinuance proposal are information obtained by aggregating the supply reliability level indices calculated for the respective systems by the power transmission system evaluation module 33 and the power distribution system evaluation module 42. This information is acquired from the power transmission system evaluation data 142 and the power distribution system evaluation data 152 by the system plan proposal comparative evaluation module 113, and is stored in the plan proposal evaluation data 134. Further, evaluation results of the cost efficiency are also calculated for the respective systems by the power transmission system evaluation module 33 and the power distribution system evaluation module 42, and are stored in the power transmission system evaluation data 142 and the power distribution system evaluation data 152. After that, aggregated data is stored in the plan proposal evaluation data 134 by the system plan proposal comparative evaluation module 113.

Figure 19:
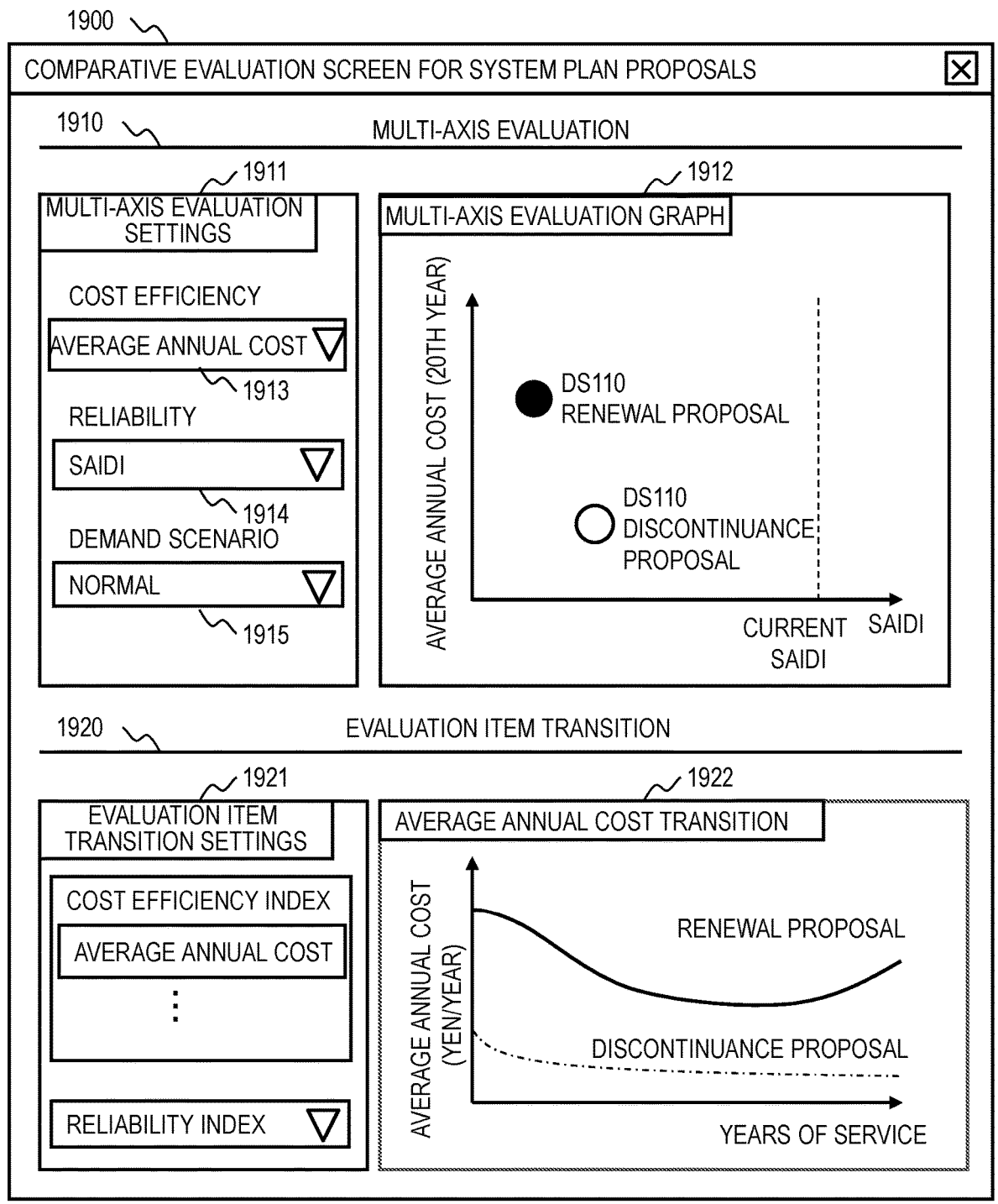
FIG. 19 is a diagram for illustrating a comparative evaluation screen for system plan proposals.

In the processing steps of from Step 405 to Step 408, the cost efficiency and the reliability are repeatedly evaluated for all system plan proposals. After all system plan proposals have been evaluated, in Step 409, the system plan proposal comparative evaluation module 113 comparatively evaluates the system plan proposals. FIG. 19 is an illustration of a comparative evaluation screen 1900 for the system plan proposals, which is generated by the system plan proposal comparative evaluation module 113 to be output by the output unit 24. The comparative evaluation screen 1900 is formed of a multi-axis evaluation 1910 and an evaluation item transition 1920. In the multi-axis evaluation 1910, evaluation results of the system plan proposals are output to a multi-axis evaluation graph 1912 in terms of two or more evaluation items selected in multi-axis evaluation settings 1911.

In the multi-axis evaluation settings 1911, evaluation items to be set on the axes of the multi-axis evaluation graph 1912 are selected from cost efficiency 1913 and reliability 1914. For example, the average annual cost is selected for the cost efficiency, and the SAIDI is selected for the reliability. In a demand scenario 1915, a scenario for a rate of change in power demand during an evaluation period is selected. For example, a rate of change in demand set from a demand history in a predetermined period may be selected, or a demand scenario accompanying an increase in introduction of renewable energy may be selected.

For example, the average annual cost is set for the cost efficiency, the SAIDI is set for the reliability, and a comparative evaluation is performed between the renewal proposal and the discontinuance proposal of the power distribution substation DS110. In the multi-axis evaluation graph 1912, the SAIDI values are successfully reduced from the current SAIDI for both the renewal proposal and the discontinuance proposal of the power distribution substation DS110. However, as shown in the reliability 1700 of the renewal proposal and the reliability 1800 of the discontinuance proposal, the renewal proposal is higher in improvement effect of the SAIDI. Meanwhile, the average annual cost is lower for the discontinuance proposal. This is because large facility renewal construction costs and facility maintenance costs are continuously required for the renewal proposal, while the discontinuance proposal enables the facility maintenance costs to be greatly reduced due to the facility discontinuance.

In the evaluation item transition 1920, a chronological transition graph 1922 in terms of a single evaluation item designated in evaluation item transition settings 1921 is output. Transitions in the average annual cost of the renewal proposal and the discontinuance proposal of the power distribution substation DS110 are described as an example. As shown in the chronological transition graph 1922, for the renewal proposal, the facility renewal construction costs are recorded in the first year, and the facility maintenance costs are continuously recorded after the first year. Meanwhile, for the discontinuance proposal, facility discontinuance construction costs and power distribution system countermeasure costs are recorded in the first year, but facility maintenance costs are not required.

In this comparison between the renewal proposal and the discontinuance proposal of the power distribution substation DS110, the value of the SAIDI can be improved by both proposals, but the discontinuance proposal is superior in terms of cost efficiency. In other words, the discontinuance proposal enables facility investment costs to be suppressed by avoiding facility renewal while ensuring a predetermined level of reliability.

According to the at least one embodiment, a system plan is formulated in consideration of a power supply capacity that can be compensated for through a configuration change of the power distribution system, and effects on the entire power system are calculated on trial and presented, to thereby be able to support the formulation of an optimal system plan for the entire system.

The example of discontinuing a power distribution substation has been described above, but the features of the at least one embodiment can be applied to discontinuance or renewal of other facilities in the power transmission system, for example, further upper-level substation facilities, power transmission lines, and buses. For example, the discontinuance of an upper-level substation may involve the discontinuance of one or a plurality of power distribution substations provided downstream thereof, and a change in the power capacity (power supply capacity) of an upper-level facility may cause a change in the power capacity of the power distribution substations. The configuration change of the power transmission system includes changes in the amount of power supplied to power distribution substations in addition to the discontinuance and renewal of facilities.

As another example, the at least one embodiment can be applied when facility enhancement for relieving power transmission congestion in the power transmission system is examined. For example, it is required to enhance facilities of power transmission lines and upper-level substations in order to handle the power transmission congestion caused by increased introduction of distributed power sources such as renewable energy. In view of this, the load amount connected to the power distribution substation is adjusted through the load accommodation of the power distribution system, to thereby be also able to relieve congestion in the power transmission system and avoid facility enhancement or reduce a required amount of facility enhancement. The load accommodation of the power distribution system is determined within a range of the load accommodation capacity.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. A system for supporting creation of a system plan to change a configuration of a power system including a power transmission system and a power distribution system, the system comprising:
    one or more processing devices; and
    one or more storage devices,
    wherein the one or more storage devices are configured to store information on a configuration of the power transmission system and information on a configuration and a load of the power distribution system, and
    wherein the one or more processing devices are configured to:
        determine, based on the information on the configuration and the load of the power distribution system, a load accommodation capacity between power distribution substations which indicates a power supply capacity allowed to be compensated for between the power distribution substations through a configuration change of the power distribution system;
        create a system plan proposal including a change in system configuration of the power transmission system and the power distribution system based on the load accommodation capacity; and output information on the system plan proposal to an output device.

2. The system according to claim 1,
wherein the one or more storage devices are configured to store information on failures of each facility of the power transmission system, and
wherein the one or more processing devices are configured to:
  determine a facility against which countermeasures are to be taken in the power transmission system based on the information on failures; and
  create, for countermeasures against the facility against which countermeasures are to be taken, the system plan proposal including a change in system configuration of the power transmission system and the power distribution system based on the load accommodation capacity.

3. The system according to claim 1,
wherein the one or more storage devices are configured to store information on failures of each facility of the power transmission system, and
wherein the one or more processing devices are configured to:
  determine a power distribution substation against which countermeasures are to be taken based on information on failures of the power distribution substations, which is indicated by the stored information on failures; and
  select a facility against which countermeasures are to be taken based on the information on failures from among facilities of the power transmission system that exert influences on failures of the power distribution substation against which countermeasures are to be taken.

4. The system according to claim 1,
wherein loads of the power distribution system are managed in a plurality of distribution areas,
wherein the plurality of distribution areas each include one or more power distribution substations, and
wherein the one or more processing devices are configured to:
  determine a supply reliability level of each distribution area of the plurality of distribution areas based on information on failures and information on loads of the one or more power distribution substations included in the each distribution area;
  determine a distribution area against which countermeasures are to be taken based on the supply reliability levels of the plurality of distribution areas; and
  determine a power distribution substation against which countermeasures are to be taken based on the information on failures and the information on the loads, from among power distribution substations included in the distribution area against which countermeasures are to be taken.

5. The system according to claim 1, wherein the one or more processing devices are configured to determine the load accommodation capacity based on a supply reliability level of the power distribution system of each of the power distribution substations.

6. The system according to claim 1, wherein the one or more processing devices are configured to determine the load accommodation capacity based on a load capacity and a supply reliability level of the power distribution system of each of the power distribution substations.

7. The system according to claim 1,
wherein the one or more storage devices are configured to store information regarding failures of each facility of the power transmission system, and
wherein the one or more processing devices are configured to:
  determine a power distribution substation against which countermeasures are to be taken among the power distribution substations based on the information regarding failures;
  determine the load accommodation capacity of each power distribution substation adjacent to the power distribution substation against which countermeasures are to be taken with respect to the power distribution substation against which countermeasures are to be taken; and
  determine abandonment of the power distribution substation against which countermeasures are to be taken when the load accommodation capacity of the adjacent power distribution substation indicates that the power distribution substation against which countermeasures are to be taken is abandonable.

8. The system according to claim 1, wherein the one or more processing devices are configured to:
  evaluate at least one of a supply reliability level or a cost of the system plan proposal; and
  output a result of the evaluation to the output device.

9. The system according to claim 1, wherein the one or more processing devices are configured to:
  evaluate a supply reliability level and a cost of the system plan proposal; and
  simultaneously output both results of evaluating the supply reliability level and the cost to the output device.

10. The system according to claim 1, wherein the one or more processing devices are configured to:
  individually evaluate the power transmission system and the power distribution system in the system plan proposal; and
  output a comprehensive evaluation result obtained by aggregating results of evaluating the power transmission system and the power distribution system to the output device.

11. A method of supporting, by a system, creation of a system plan to change a configuration of a power system including a power transmission system and a power distribution system,
  the system being configured to store information on a configuration of the power transmission system and information on a configuration and a load of the power distribution system,
the method comprising:
  determining, by the system, based on the information on the configuration and the load of the power distribution system, a load accommodation capacity between power distribution substations which indicates a power supply capacity allowed to be compensated for between the power distribution substations through a configuration change of the power distribution system;
  creating, by the system, a system plan proposal including a change in system configuration of the power transmission system and the power distribution system based on the load accommodation capacity; and
  outputting, by the system, information on the system plan proposal to an output device.

* * * * *